(12) United States Patent
Kay

(10) Patent No.: US 7,603,549 B1
(45) Date of Patent: Oct. 13, 2009

(54) NETWORK SECURITY PROTOCOL PROCESSOR AND METHOD THEREOF

(75) Inventor: Rony Kay, Cupertino, CA (US)

(73) Assignee: cPacket Networks Inc., Mountain View, CA (US)

( * ) Notice: Subject to any disclaimer, the term of this patent is extended or adjusted under 35 U.S.C. 154(b) by 604 days.

(21) Appl. No.: 10/364,996

(22) Filed: Feb. 11, 2003

(51) Int. Cl.
  *H04L 29/06* (2006.01)
(52) U.S. Cl. .................... 713/160; 713/153; 726/26
(58) Field of Classification Search ......... 713/160–161, 713/185, 167; 380/229; 705/67; 709/249; 723/4
See application file for complete search history.

(56) References Cited

U.S. PATENT DOCUMENTS

| | | | | |
|---|---|---|---|---|
| 5,802,320 A | * | 9/1998 | Baehr et al. | 709/249 |
| 6,101,543 A | * | 8/2000 | Alden et al. | 709/229 |
| 6,286,104 B1 | * | 9/2001 | Buhle et al. | 726/4 |
| 6,870,929 B1 | * | 3/2005 | Greene | 380/28 |
| 7,003,118 B1 | * | 2/2006 | Yang et al. | 380/287 |

OTHER PUBLICATIONS

Orman, The Oakley Key Determination Protocol, Department of Computer Science University of Arizona, 1997, p. 58.*
Waldvogel, Scalable High Speed IP Routing Lookups, 1997, ACM, p. 2.*

* cited by examiner

*Primary Examiner*—Kimyen Vu
*Assistant Examiner*—Yogesh Paliwal
(74) *Attorney, Agent, or Firm*—Haynes and Boone, LLP

(57) ABSTRACT

A cryptographic processor having an in-line (i.e., "bump-in-the-wire") architecture processes data packets between a trusted domain and a untrusted domain, according to a predetermined security protocol. The cryptographic processor can be implemented as a stand-alone device, without requiring a change in the configuration of the host machine. Unlike a conventional hardware acceleration of a "bump-in-the-stack" implementation, which is typically implemented as a layer between the native IP layer and the network drivers in an IP protocol stack and uses a single bus interface (e.g., a PCI-X bus) for all data traffic, the cryptographic processor acts as a security gateway, providing separate interfaces for the trusted and the untrusted domains. The cryptographic processor includes pipeline stages for carrying a feedback encryption algorithm with optimal throughput.

25 Claims, 9 Drawing Sheets

*encryption*

$$ENC_K(P1 \; xor \; IV) = C1$$
$$ENC_K(P2 \; xor \; C1) = C2$$
$$ENC_K(P3 \; xor \; C2) = C3$$
$$\vdots$$

decryption $$DEC_K(C1) \; xor \; IV = P1$$
$$DEC_K(C2) \; xor \; C1 = P2$$
$$DEC_K(C3) \; xor \; C2 = P3$$
$$\vdots$$

NETWORK SECURITY PROTOCOL PROCESSOR AND METHOD THEREOF

BACKGROUND OF THE INVENTION

1. Field of the Invention

The present invention relates to a device for handling a network security protocol. In particular, the present invention relates to a device that encrypts and decrypts data packets at network speed according to a network security protocol.

2. Discussion of the Related Art

In popular network protocol architectures, such as in a transport control protocol/internet protocol (TCP/IP) network, a network security protocol typically requires encrypting the payload of a data packet and providing integrity check data bits.

For example, FIG. 1 illustrates encryption of a packet under the "tunnel mode" of the IPsec network security protocol. As shown in FIG. 1, under the tunnel mode, data packet 101, including its header portion 101a and payload portion 101b, is encrypted using a cryptographic algorithm (e.g., DES, or Triple DES) specified under one or more agreed security policies and/or "Security Associations" between the sender and the recipient. The resulting new packet 102 includes data packet 101 as its new payload 102b, new header 102a, and trailer 102c. Typically, trailer 102c includes "integrity check" data bits that are used by a recipient of data packet 102 to determine whether data packet 102 is corrupted or compromised in transit.

Network security protocols, such as IPsec, require extensive computation. In the prior art, IPsec is often provided as software executed in a general-purpose computer system, such as computer system 200 shown in FIG. 2. As shown in FIG. 2, computer system 200 includes central processing unit (CPU) 201, communicating over bus 208 with memory system 203, peripherals 204, storage system 205, direct memory access (DMA) controller 202, and input and output (I/O) devices 206 and 207. CPU 201 may be implemented, for example, by a general purpose microprocessor. DMA controller 202 provides access by peripheral and I/O devices 206 and 207 to memory system 203. I/O devices 206 and 207 may include, for example, network interfaces for interfacing computer system 200 with an external data network in which packetized secured communication under IPsec occurs.

The increase in processing power of a general purpose microprocessor (such as CPU 201 of computer system 200) cannot keep up with the increasing network data rates achieved in recent years. As a result, CPU 201 often becomes the performance bottleneck for network traffic. One method for providing a higher throughput includes off-loading the cryptographic processing of data packets for execution in a co-processor. In some implementations, to provide an even higher throughput and to avoid congestion at the system data bus, communication between the CPU and the co-processor is carried out on a separate data bus that typically operates at a higher data rate than bus 208 of computer system 200. FIG. 3 shows complex multi-bus computer system 300 for processing network traffic, which includes cryptographic co-processor (CCP) 301, and network processor (NPU) 303. In multi-bus computer system 300, dedicated data buses 304 and 305 provide high bandwidth data communication among CCP 301 and NPU 303. NPU 303, can be used to provide data traffic processing, such as switching and routing. NPU 303 can be provided with high speed memory 302 to achieve a high data rate. High speed memory 302 can be implemented, for example, by a content addressable memory (CAM). Often, additional hardware, such as a load-balancer, distributes the network traffic among a number of NPUs to provide parallelism for operations at higher data rates.

Multiple data buses, CCPs, NPUs and CAMs add substantial cost and complexity to the system. Moreover, even such complex systems cannot keep up with the rate at which network data rates increase.

SUMMARY

The present invention provides an in-line (i.e., "bump-in-the-wire") architecture for a cryptographic processor between a trusted domain and an untrusted domain. The cryptographic processor of the presented invention can be implemented as a stand-alone device, without requiring a change in the configuration of the host machine. Unlike a conventional way to accelerate "bump-in-the-stack" implementation, which is typically implemented as hardware accelerator card (sub-system) with a single bus interface (e.g., a PCI-X bus) for all data traffic, the in-line cryptographic processor acts as a security gateway, providing separate interfaces for the trusted and the untrusted domains.

According to one embodiment of the present invention, the cryptographic processor is implemented as an integrated circuit having first and second network interfaces and first and second data paths for processing the inbound data packets (i.e., data packets from the untrusted domain) and the outbound data packets (i.e., data packets from the trusted domain). In the datapath for the outbound data packets, a novel pipelined encryption circuit is provided in the cryptographic processor to carry out a feedback encryption algorithm. A packet building circuit provides integrity check and validation bits to allow detection of corruption or compromise of the data packets en route to their destinations.

Because the cryptographic processor can be implemented using pipelining, with each pipeline stage providing an optimized throughput of one block of data bits per clock period, very high throughput can be achieved even when using a moderate clock speed. In one embodiment, with each pipeline stage providing a throughput of 64 bits per clock cycle, a 16 gigabit throughput is achieved using a moderate 250 MHz clock speed.

According to one embodiment of the present invention, the novel encryption circuit includes (a) a receiving stage that provides temporary storage for the data packets to be encrypted as they are received, (b) a group of buffers each receiving a data packet from the receiving stage, (c) a multiplexer which removes at each clock period a predetermined number of data bits ("block") from a different one of the data packets in the buffers according to a predetermined schedule; and (d) the pipeline stages for performing the feedback encryption algorithm on each of the blocks of data bits removed by the multiplexer. To implement a feedback encryption algorithm, where each block is encrypted using the encrypted result of a previous block, the number of pipeline stages for implementing the feedback encryption algorithm with optimal performance should correspond (e.g. not greater than) to the number of buffers. The novel encryption circuit is most suitable for use with an encryption algorithm using cipher block chaining (CBC).

In one embodiment, the cryptographic processor may include a security policy lookup circuit in each datapath for identifying the applicable security policies for each data packet to be processed. Furthermore, the cryptographic processor may also include a security association lookup circuit for identifying the applicable security associations for each data packet to be processed. To facilitate look-up of security policies and security associations, security policy and security associations can be provided in cache memories on the integrated circuit. The cache memories can be implemented using content addressable memories. However, to achieve more efficient use of silicon real estate, a novel cache memory is provided according to one embodiment of the present invention. The novel cache memory includes (a) a memory array for storing the security policies or security associations according to a sorted order, (b) a comparator to determine if the entry sought is found among the entries in the memory array, and (c) a control circuit for conducting a search of the entries in the memory array, and for inserting entries into and deleting entries from the memory array. In one embodiment, the control circuit includes a state machine that implements a binary search algorithm for searching the memory array using a key to be matched.

According to one embodiment of the present invention, a state machine is included in the cryptographic processor which is capable of executing a key exchange protocol, such as the internet key exchange (IKE) protocol, for setting up secured communication.

The present invention is better understood upon consideration of the detailed description below and the accompanying drawings.

BRIEF DESCRIPTION OF THE DRAWINGS

To facilitate cross-referencing between figures, like elements are assigned like reference numerals.

DETAILED DESCRIPTION OF THE PREFERRED EMBODIMENTS

Figure 1:
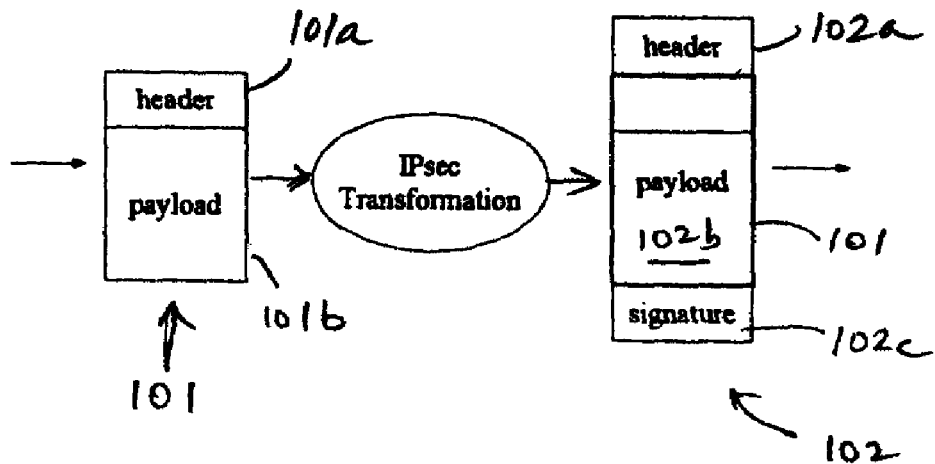
FIG. 1 illustrates encryption of a packet under "tunnel mode" of the IPsec network security protocol.
Figure 2:
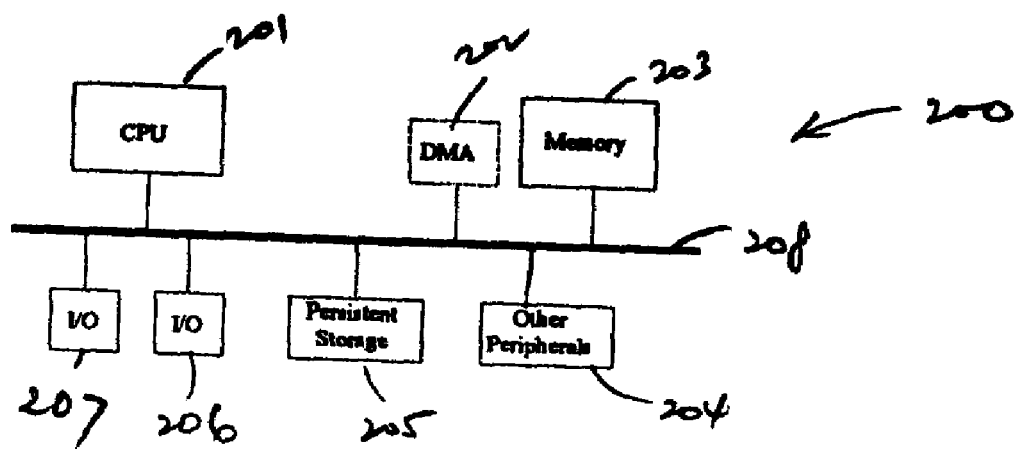
FIG. 2 shows general purpose computer system 200, which is an architecture often used to implement network security protocol IPsec.
Figure 3:
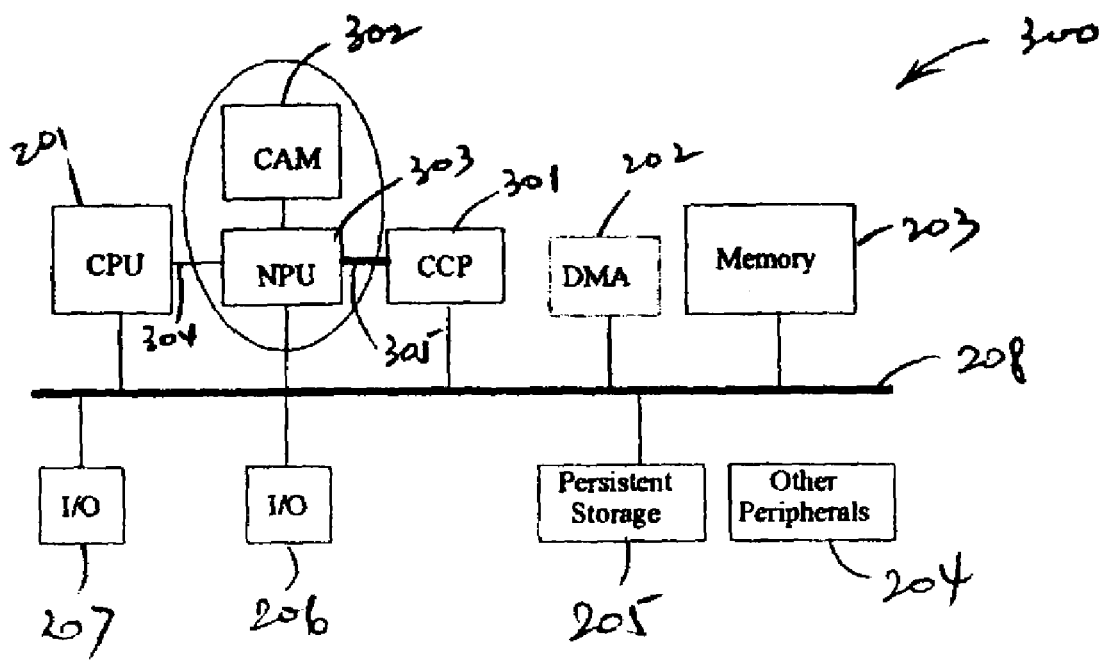
FIG. 3 shows multi-bus computer system 300 for processing network traffic, which includes cryptographic co-processor (CCP) 301, and network processor (NPU) 303.

The present invention provides an in-line (i.e., "bump-in-the-wire") architecture for a cryptographic processor between a trusted domain and an untrusted domain. The cryptographic processor of the present invention can be implemented as a stand-alone device, without requiring a change in the configuration of the host machine. Unlike a conventional way for hardware acceleration of "bump-in-the-stack" implementation, which is typically implemented as hardware acceleration device (card) with a single bus interface (e.g., a PCI-X bus) for all data traffic, such as shown in FIGS. 2 and 3, an in-line cryptographic processor acts as a security gateway, providing separate interfaces for the trusted and the untrusted domains.

Figure 9:
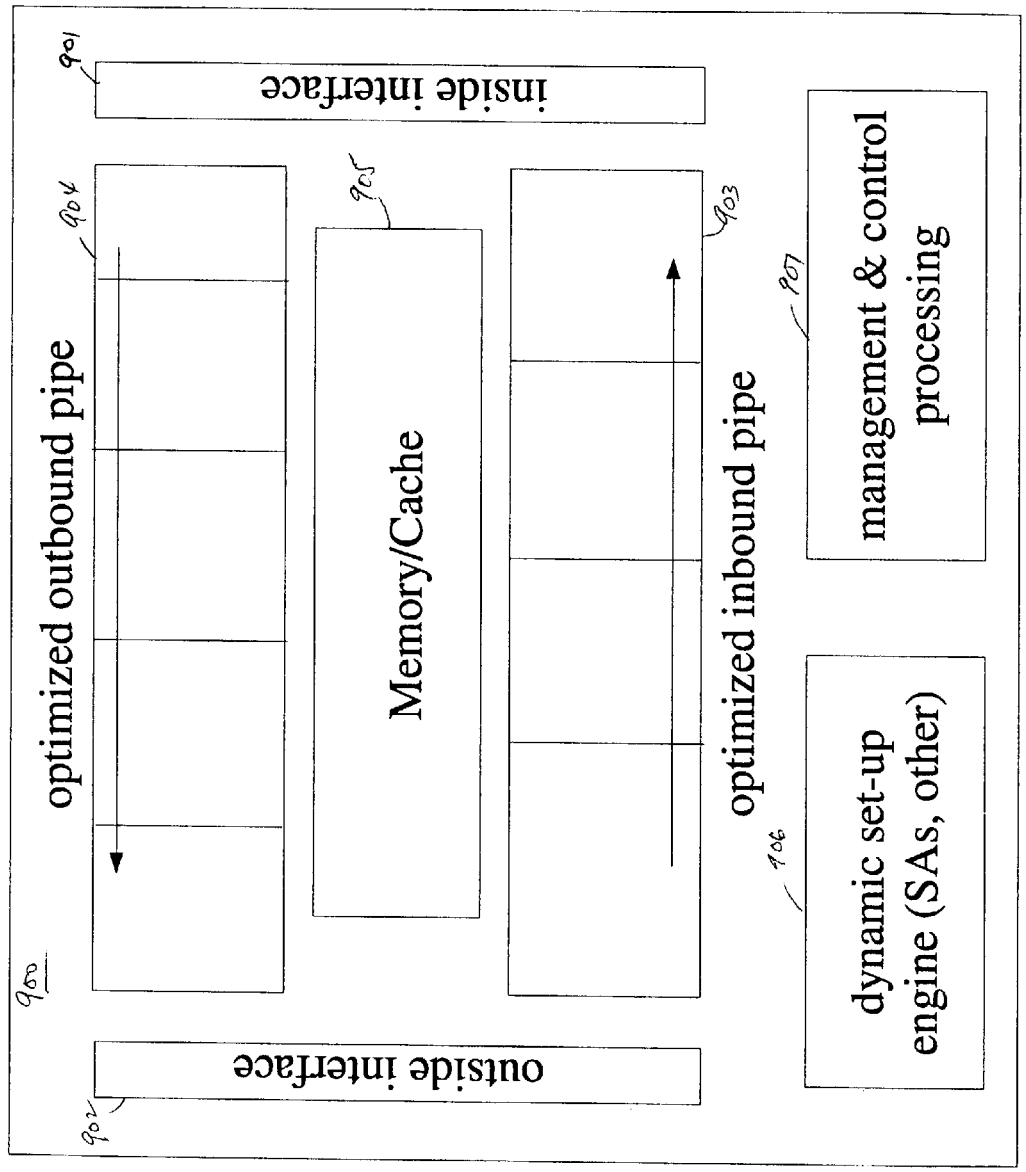
FIG. 9 is a block diagram showing the system architecture of an in-line security protocol processor 900, in accordance with one embodiment of the present invention.

FIG. 9 is a block diagram showing the system architecture of an in-line security protocol processor 900, in accordance with one embodiment of the present invention. As shown in FIG. 9, processor 900 includes interface 901 for data communication with a trusted domain, and interface 902 for data communication with an untrusted domain. Data packets designated for the trusted domain are processed under the security protocol by the circuits in inbound datapath 903, which may be implemented as a pipeline optimized for a specified maximum throughput at every stage. Similarly, data packets designated to be sent through the untrusted domain are processed under the security protocol by the circuits in outbound datapath 904. Like inbound datapath 903, outbound datapath 904 may also be implemented as a pipeline optimized for a specified throughput at every stage. Memory structure 905, optimized for access by inbound and outbound datapaths 903 and 904, provides memory for computation and caching of necessary reference data, such as security policies or security associations. In addition, security protocol processor 900 provides hardware support in dynamic set-up engine 906, which performs the tasks for setting up or tearing down connections dynamically, as required under the security protocols. Management and control processing circuit 907 controls the operations of security protocol processor 900, and handles any exception condition not processed in the datapaths. A general purpose central processing unit (CPU), and its attendant firmware, may be provided in management and control processing circuit 907.

Figure 4:
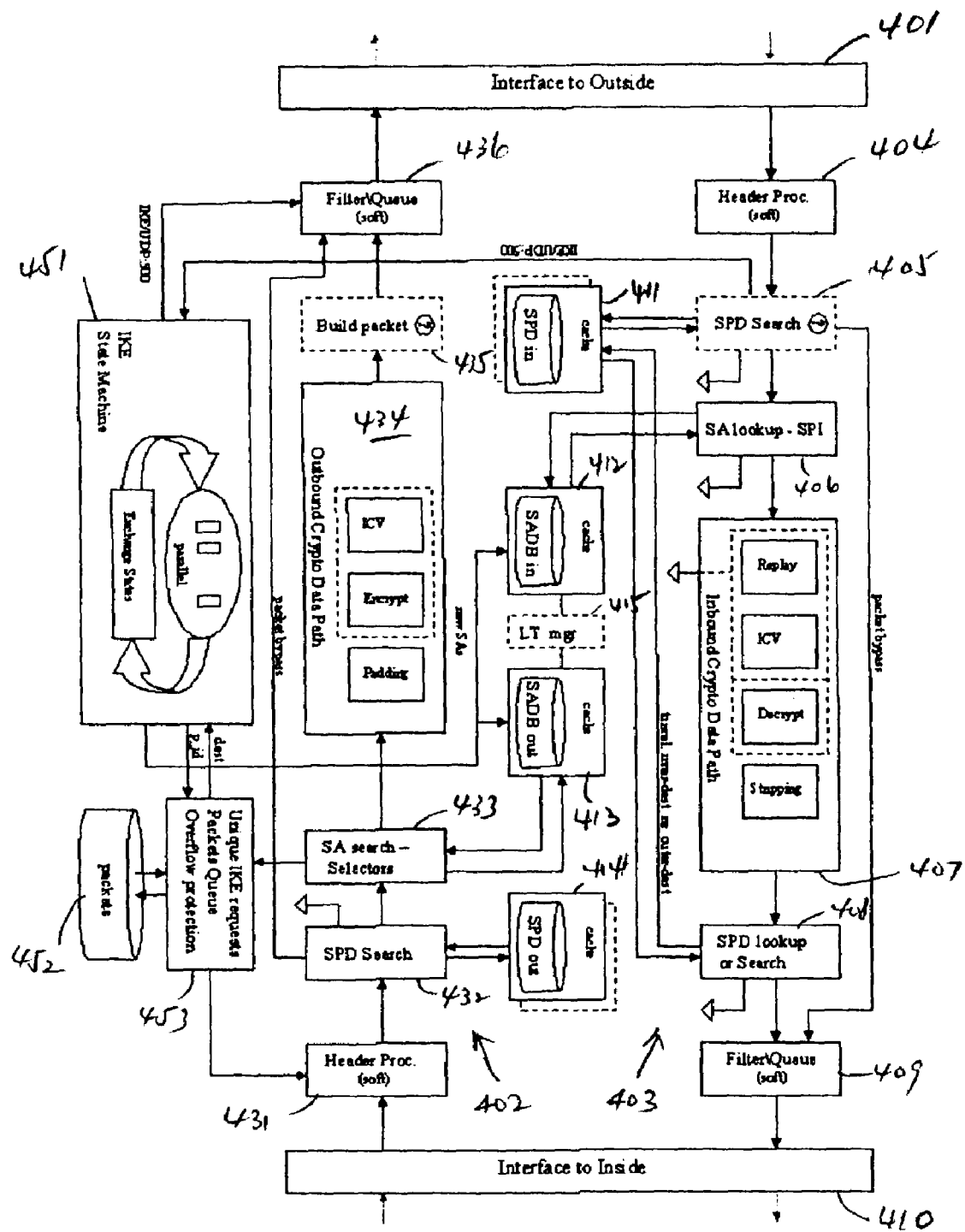
FIG. 4 is a block diagram of a cryptographic processor implemented in an integrated circuit, in accordance with one embodiment of the present invention.

FIG. 4 is a block diagram of a cryptographic processor 400 implemented in an integrated circuit, in accordance with one embodiment of the present invention. In the embodiment shown, cryptographic processor 400 implements the IPsec security architecture discussed, for example, in "Security Architecture for the Internet Protocol," RFC 2401, November 1998, available from Internet Engineering Task Force (http://www.ietf.org). As shown in FIG. 4, cryptographic processor 400 provides interfaces 401 and 410 for interfacing with the untrusted domain ("outbound") and the trusted domain ("inbound"). The interfaces may receive, for example, IP packets from the media access (MAC) layer, and may conform to an interface standard, such as Ethernet (PHY/MAC) or a switch fabric (e.g., CSIX). Between interfaces 401 and 410 are two datapaths 402 and 403, for processing outbound and inbound data packets, respectively. In this implementation, datapaths 402 and 403 include a number of pipeline stages each processing a predetermined number of bits (i.e., a "chunk" or a "block" of bits) per clock period. A convenient block size suitable for this implementation is, for example, an integral multiple of 64 bits, which are the block sizes defined for block ciphers under IPsec for DES, 3DES and AES encryptions. Thus, even if cryptographic processor 400 is clocked at 250 MHz—a relatively low clock rate among today's integrated circuits—a 16 gigabits throughput can be achieved. According the present invention, the delay and latency of the packet are designed to be substantially deterministic, depending neither on the distribution of the sizes of the packet processed, nor the stochastic arrival behavior of the packets.

An inbound data packet is received over interface 401 into header processing circuit 404, which parses the header information. The data packet may relate to call set-up, which includes the process of exchanging the initial encryption keys using a key management protocol (e.g., IKE) and setting up the security associations ("SAs"). Key management activities are handled by IKE state machine 451. Packets involved in the "hand-shaking" that is responsive to an IKE request received in inbound datapath 403 are created by circuit 453, queued and transmitted by outbound datapath 402. Upon completion of the set-up procedures, the security associations created are loaded into the inbound and outbound security association databases ("SADBs") stored in SADB cache memories 412 and 413, respectively. A suitable construction for SADB cache memories 412 and 413 is explained in further detail below. As configuration information—which specifies the transformation required for each "chunk" of data—is processed for each packet, configuration information are carried in the datapaths with the "chunks." Examples of configuration data include the specific encryption algorithm to apply for each packet, and the existence and nature of any authentication trailer (e.g., the integrity check value "ICV").

Figure 5:
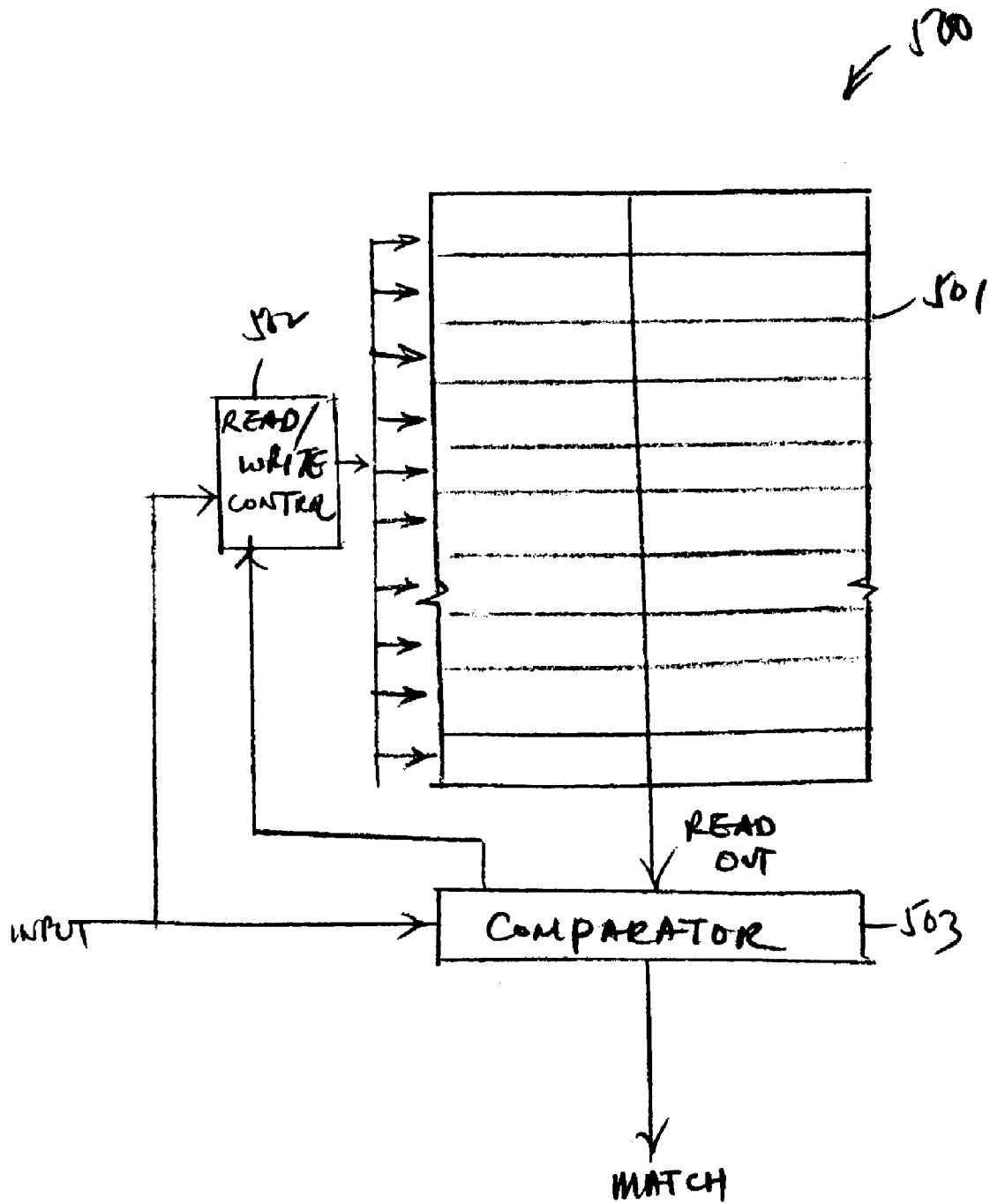
FIG. 5 shows a space-efficient cache memory structure 500, suitable for implementing cache memory 411 according to one embodiment.

During the life of a secured connection (e.g., under IPsec and TCP/IP), based on the header information, a data packet is passed into security policy database (SPD) search circuit 405, which identifies one or more applicable inbound security policies for the packet. Cache memory 411 ("inbound packet SPD cache") is provided to store the current valid security policies. To provide high-speed security policy lookup, cache memory 411 can be provided by content addressable memories (CAM), for example. CAMs, however, require large silicon areas due to the large number of comparator circuits required. Thus, as shown in FIG. 5, a space-efficient cache memory structure 500, suitable for implementing cache memory 411, is provided in this embodiment. Cache memory structure 500 provides only a small number of comparators (e.g., one) and, ideally, requires only $\log_2 N$ cycles or less to find a matching entry, where N is the total number of entries in memory array 501. To achieve this performance, the entries in cache memory 411 are stored in a sorted order. State machine 502 implements a binary search algorithm to select entries for comparison in comparator 503. A match signal is asserted when the key portion of the entry retrieved from memory array 501 matches the search key. In this embodiment, the entries in cache memory, e.g. cache memory 411, are sorted by design. Here, "sorting" refers to maintaining a strict ordering of the values stored in memory array 501. To facilitate sorting, each word in memory array 501 can be loaded from either one of its neighboring words. To insert a new entry, state machine 502 performs a binary search to identify the position in memory array 501 at which the new entry should be inserted. All entries greater than the new entry are shifted one position by having each word load the value of its neighbor in the lesser direction. The new entry is then written into the desired word. Deletion can be achieved by having the word to be deleted, and each word in the greater direction, load the value stored in its neighbor in the greater direction.

Returning to SPD search circuit 405 of FIG. 4, security policy lookup may result in the data packet being dropped, allowed to pass through without further security processing, or be provided to stage 406 for further security processing (i.e., inbound SA lookup), according to the IPsec protocol. Under IPsec, an SA is identified by a security parameter index (SPI), an IP designation address and a security protocol identifier, such as authentication header ("AH") or encapsulating security payload ("ESP"). In this embodiment, SA lookup for an inbound data packet is carried out in SADB cache memory 412, which can also be implemented by cache memory structure 500 of FIG. 5.

When the applicable SA is identified, the inbound packet can be decrypted in decryption circuit 407. As shown in FIG. 4, under the IPsec protocol, decryption includes anti-replay detection, integrity check verification (ICV) and decryption of the payload. Anti-replay detection and ICV detect whether or not the inbound packet has been corrupted or compromised in transit.

Figure 6A:
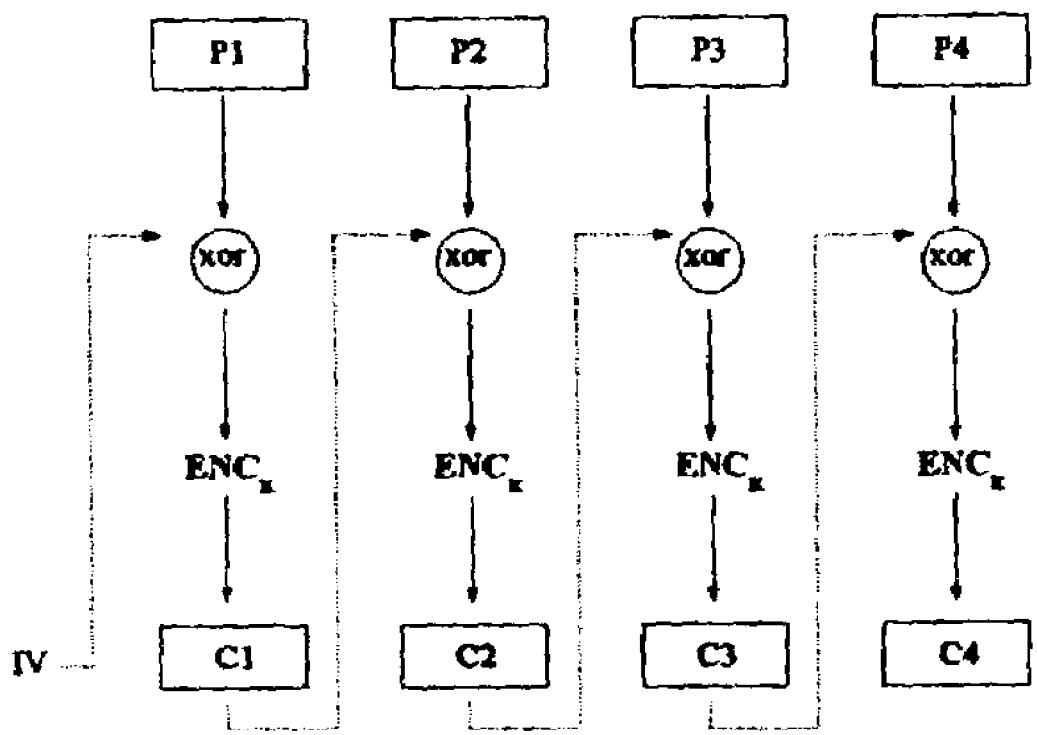
FIG. 6a shows the process of encryption under CBC mode of block ciphers.
Figure 6B:
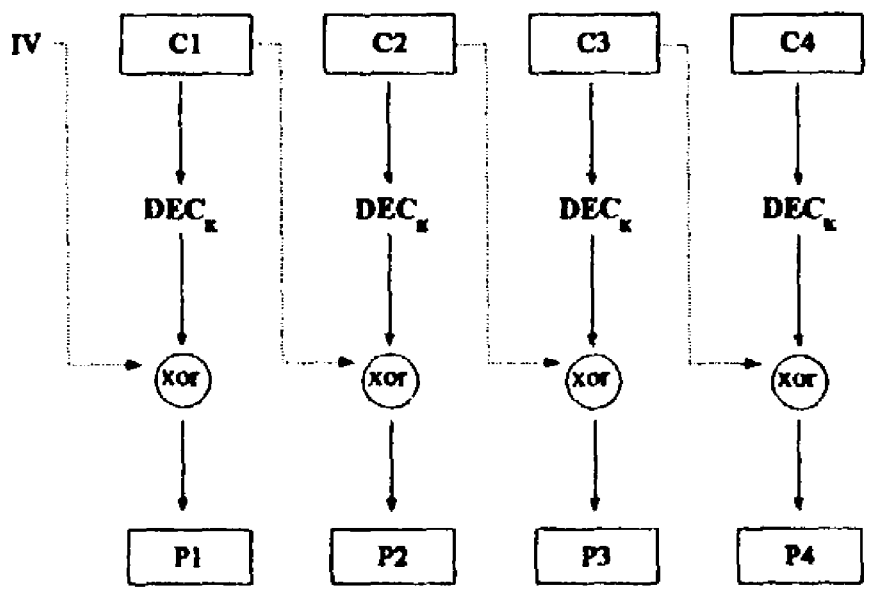
FIG. 6b shows the process of decryption under CBC mode of block ciphers.

IPsec supports feedback modes for encrypting arbitrary length data with block ciphers. Feedback modes include cipher block chaining (CBC), cipher feedbacks (CFB) and output feedback (OFB). In non-feedback modes, such as electronic code book (ECB) mode, each block (e.g., 64 bits) is encrypted independently of other blocks. Thus, pipelining techniques can be easily applied to block decryption under a non-feedback mode. Under a feedback mode, however, each block is encrypted using a preceding encrypted block, such as illustrated by FIG. 6a. As shown in FIG. 6a, illustrating CBC mode, cipher block $C_i$ of the $i^{th}$ plain text block $P_i$ of a data packet is encrypted by applying encryption algorithm $ENC_K$ (e.g., 3DES) to the XOR of plain text block $P_i$ and immediately preceding cipher text block $C_{i-1}$. Encryption algorithm $ENC_K$ may require several clock periods (i.e., multiple single clock period stages in the pipeline) to complete encryption of a block. The initial vector IV is provided as the $0^{th}$ cipher text block $C_0$. FIG. 6b shows decryption under CBC mode. In encryption under CBC mode, since encryption of plain text block $P_i$ cannot proceed until immediately preceding encrypted block $C_{i-1}$ is available, conventional wisdom erroneously teaches that pipelining the encryption process is difficult or impossible as a result of the data dependency between cipher text blocks. As explained with respect to outbound datapath 402, the present invention provides a method for pipelining the encryption process under CBC.

Unlike encryption, since the cipher text block $C_{i-1}$ is available at the time cipher text block $C_i$ is to be decrypted, the decryption process can be pipelined in the conventional manner. The IPsec overhead is then stripped from the decrypted payload, and the original IP packet which has been subjected to the IPsec processing is recovered. A further search in SPD cache 411 by SPD lookup circuit 408 recovers the destination address of the packet in the trusted domain. The recovered IP data packets are filtered and queued in filter and queue circuit 409 to be provided to the trusted domain over interface 410.

An outbound data packet is received over interface 410 into outbound header processing circuit 431, which parses the header information. Based on the header information, a data packet is passed into security policy database (SPD) search circuit 432, which identifies one or more applicable outbound security policies for the packet. Cache memory 414 ("outbound packet SPD cache") is provided to store the valid security policies in force. The space-efficient cache memory structure 500 discussed above with respect to FIG. 5 is suitable for implementing cache memory 414 in this embodiment. Security policy lookup in SPD cache 414 may result in the data packet being dropped (i.e., not allowed to be passed into the untrusted domain), allowed to pass through without further security processing, or be provided to stage 433 for further processing (i.e., outbound SA lookup), according to the IPsec protocol. In this embodiment, SA lookup for an outbound packet is carried out in SADB cache memory 413, which can also be implemented by cache memory structure 500 of FIG. 5.

When the applicable SA is identified, the outbound packet can be encrypted in encryption circuit 434. As shown in FIG. 4, encryption includes padding, providing integrity check verification (ICV) data bits and encryption of the payload. Padding ensures that the outbound packet is processed as an integral multiple of the block size, and ICV data bits allow the recipient to detect whether or not the packet has been corrupted or compromised in transit.

Figure 7:
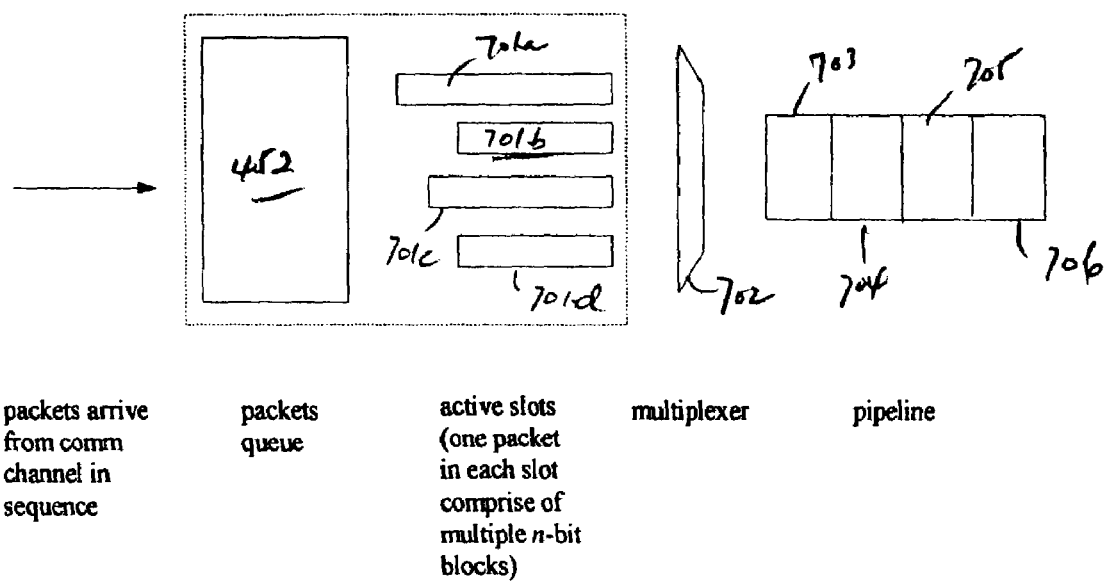
FIG. 7 is a block diagram showing a buffering, multiplexing and pipelining (BMP) architecture 700 that can be provided, according an embodiment of the present invention, to optimally pipeline encryption under CBC mode.

As mentioned above, under a feedback encryption mode, however, each block is encrypted using a preceding encrypted block, such as illustrated by FIG. 6a and discussed above. Unlike decryption discussed above, since the cipher text block $C_{i-1}$ is available only after a few clock periods of plain text block $P_i$ is ready, conventional wisdom teaches that the encryption process cannot be pipelined. This is not the case. According to the present invention, a novel buffering, multiplexing and pipelining (BMP) architecture can be provided to avoid stalling in the pipeline to wait for complete encryption of the cipher text block $C_{i-1}$. This BMP architecture is illustrated in block diagram of BMP structure 700 in FIG. 7. As shown in FIG. 7, as outbound packets arrive sequentially from interface 410 and propagate in the outbound datapath 904, the packets are stored in a packet queue provided in buffer 452. A number of outbound packets, (for example, a number that is equal to the number of pipeline stages used to encrypt a block), are then provided in active slots 701-a to 701-d at the input terminals of multiplexer 702. During encryption, multiplexer 702 selects one block of data from a different slot to output to the encryption circuit formed by pipeline stages 702-706 at successive clock periods. The blocks selected at successive clock periods can be selected from slots 701-a to 701-d in a round-robin manner, for example, or another suitable selection schedule. Because successive blocks processed in pipeline stages 702-706 are retrieved from different packets, encryption of successive blocks from the same packet are interleaved with encryption of blocks from different packets. Thus, when each plain text block enters pipeline stage 702, the cipher text block upon which it depends, as specified by the feedback encryption algorithm, is already available. Thus, BMP structure 700 does not need to stall to wait for completion of a previous encryption operation. Optimal pipeline throughput thus results.

Figure 8:
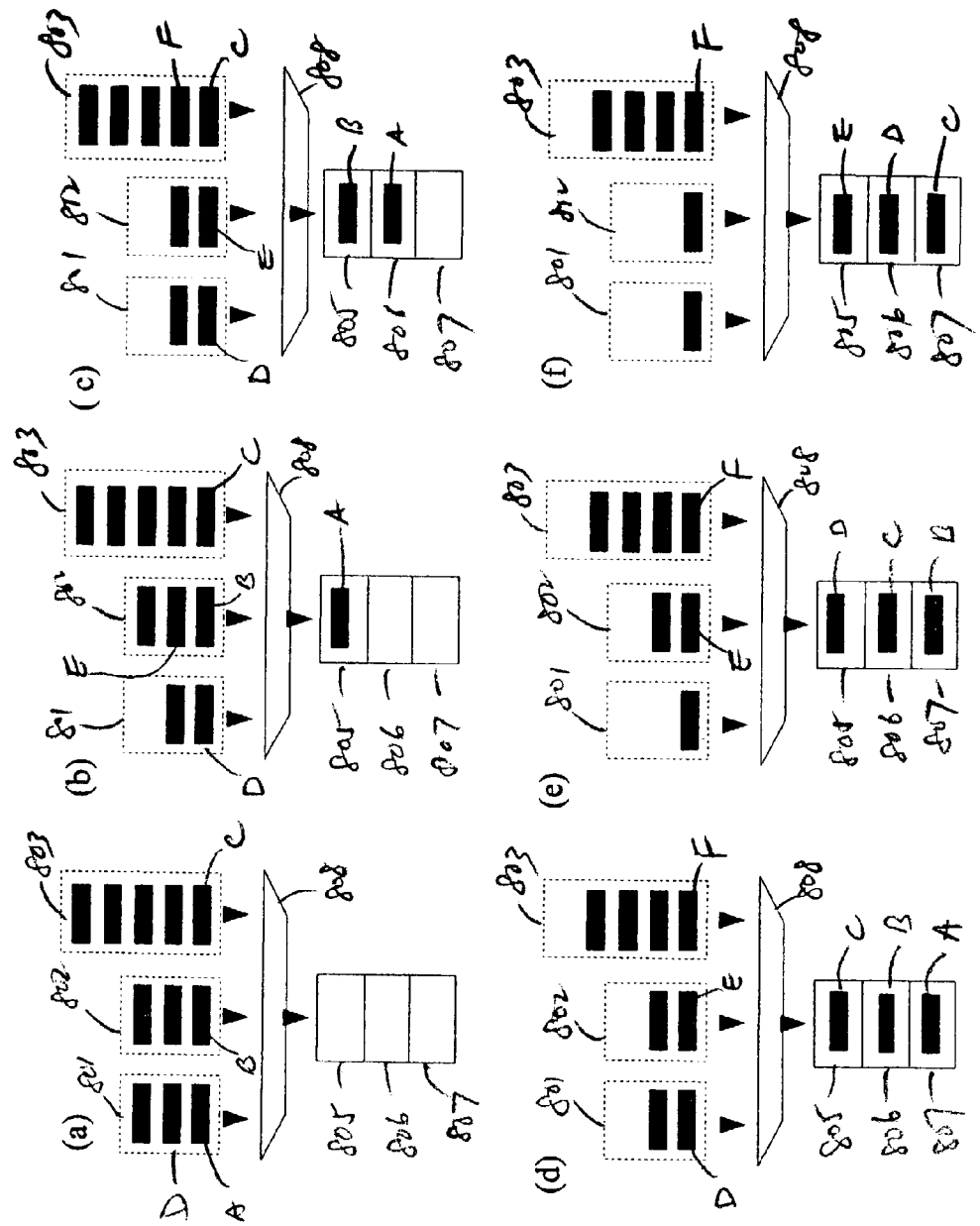
FIGS. 8(a)-(f) illustrate the operation of BMP architecture 700 in BMP structure 800.

FIGS. 8(a)-(f) illustrate the operation of BMP architecture 700 in BMP structure 800. As shown in FIG. 8(a), structure 800 includes multiplexer 808 receiving blocks from data packets 801-803 to be encrypted in pipeline stages 805-807 initially (i.e., clock period 1), FIG. 8(b) shows structure 800 selecting block A from data packet 801 for pipeline stage 805, after one clock period (i.e., clock period 2). In the next clock period (i.e., clock period 3), shown in FIG. 8(c), multiplexer 808 selects block B from data packet 802 for pipeline stage 805, while block A from data packet 801 proceeds to pipeline stage 806. In the next clock period (i.e., clock period 4), shown in FIG. 8(d), multiplexer 808 selects block C from data packet 803 for pipeline stage 805, while blocks A and B from data packets 801 and 802, respectively, proceed to pipeline stages 806 and 807. At clock period 5, shown in FIG. 8(e), multiplexer 808 selects block D from data packet 801 for pipeline stage 805. Since blocks A and D are successive blocks of packet 801, encryption of block D requires the cipher text of block A. At this time (i.e., clock period 5), encryption of block A of data packet 801 has already been completed, thus encryption of block D of data packet 801 can proceed in the pipeline of stages 805-807 without delay. FIG. 8(f) shows multiplexer 808 which selects block E from data packet 803 for pipeline stage 805, while blocks C and D of data packets 803 and 801, respectively, proceed to pipeline stages 806 and 807. Thus optimized encryption throughput for block ciphers under CBC mode is achieved.

In build packet circuit 415 (FIG. 4), the encrypted blocks for each packet are reassembled, together with a new header and integrity check verification data bits, according to the IPsec protocol, to encapsulate the encrypted payload. The IPsec processed data packets are then filtered and queued in filter and queue circuit 436 to be provided to the untrusted domain over interface 401.

Thus, a system according to the present invention can achieve high speed IPsec processing for worst-case traffic profile at full duplex network data rate throughput. Such a system can be implemented, for example, as a low-power CMOS integrated circuit operating under low to moderate clock speed to achieve high computational density at low power.

The detailed description above is provided to illustrate the specific embodiments and is not intended to limit the present invention. Numerous variations and modifications are possible within the scope of the present invention. The present invention is set forth in the following claims.

I claim:

1. An apparatus for in-line processing data packets according to a network security protocol, comprising:
   a first network interface to a first computer network;
   a second network interface to a second computer network;
   a first data path, coupled to receive the data packets from the first network interface, the first data path comprising:
      a first group of pipeline stages for encrypting the data packets, using a feedback encryption algorithm;
      a first packet building circuit that encapsulates the encrypted data packets with security data bits of the security protocol and transmits the encapsulated data packets over the second network interface; and
      a first security policy lookup circuit for identifying one or more applicable security policies under the network security protocol applicable to each data packet;
   a second data path, coupled to receive encrypted data packets that are encapsulated according to the network security protocol, the second data path comprising:
      an integrity verification circuit that examines the security data bits to determine integrity of each encrypted data packet;
      a second group of pipeline stages for decrypting the encrypted data packets;
      a second packet building circuit that transmits the decrypted data packets over the first network interface; and
      a second security policy lookup circuit for identifying one or more applicable security policies under the network security protocol applicable to each data packet.

2. An apparatus as in claim 1, wherein the first group of pipeline stages comprises:
   a receiving stage providing storage for the data packets to be encrypted;
   a plurality of buffers each receiving a data packet at a time from the receiving stage;
   a multiplexer coupled to the buffers, the multiplexer removing at each clock period a predetermined number of data bits from a different one of the data packets in the buffers according to a predetermined schedule; and
   a plurality of pipeline stages for performing the feedback encryption algorithm on each of the predetermined number of data bits removed by the multiplexer.

3. An apparatus as in claim 2, wherein the number of pipeline stages for performing the feedback encryption algorithm is not greater than the number of buffers.

4. An apparatus as in claim 1, wherein the security lookup circuit includes a cache memory for storing valid security policies.

5. An apparatus as in claim 4, wherein the cache memory comprises content addressable memories.

6. An apparatus as in claim 5, wherein the cache memory comprises a memory array, a comparator and a control circuit, and wherein the entries stored in the memory array are sorted, and the control circuit implements a binary search algorithm for searching the memory array using a key entry to be matched.

7. An apparatus as in claim 1, further comprising in each of the first and second data paths a security association lookup circuit for identifying one or more applicable security associations under the network security protocol applicable to each data packet.

8. An apparatus as in claim 7, wherein the security association lookup circuit includes a cache memory for storing valid security associations.

9. An apparatus as in claim 7, wherein the cache memory comprises content addressable memories.

10. An apparatus as in claim 7, wherein the cache memory comprises a memory array, a comparator and a control circuit, and wherein the entries stored in the memory array are sorted, and the control circuit implements a binary search algorithm for searching the memory array using a key entry to be matched.

11. An apparatus as in claim 1, further comprising a key exchange circuit including a state machine for carrying out a key exchange algorithm under the network security protocol.

12. An apparatus as in claim 1, wherein the feedback encryption algorithm comprises a cipher block chaining mode encryption algorithm.

13. An apparatus as in claim 1, wherein the apparatus is implemented in an integrated circuit.

14. A method for in-line processing data packets according to a network security protocol, comprising:
provinding a first network interface to a first computer network;
providing a second network interface to a second computer network;
using a first pipelined data path to perform:
receiving data packets from the first network interface;
encrypting the data packets, using a feedback encryption algorithm;
encapsulating the encrypted data packets with the security data bits of the security protocol and transmitting the encapsulated data packets over the second network interface; and
identifying one or more applicable security policies under the network security protocol applicable to each data packet on a first security policy lookup circuit; and
using a second pipelined data path to perform:
receiving from the second network interface encrypted data packets that are encapsulated according to the network security protocol;
verifying the integrity of the encrypted data packets by examining the security data bits of each encrypted data packet;
decrypting the encrypted data packets;
transmitting the decrypted data packets over the first network interface; and
identifying one or more applicable security policies under the network security protocol applicable to each data packet on a second security policy lookup circuit.

15. A method as in claim 14, wherein encrypting the data packets comprises:
storing data bits of each data packet to be encrypted until the entire packet is received;
storing each received data packet in one of a plurality of buffers;
removing at each clock period a predetermined number of data bits from a different one of the data packets in the buffers according to a predetermined schedule; and
performing the feedback encryption algorithm in a pipelined manner on each of the predetermined number of data bits removed.

16. A method as in claim 15, further comprising providing a number of pipeline stages for performing the feedback encryption algorithm that is not greater than the number of buffers.

17. A method as in claim 14, further comprising providing a cache memory for storing valid security policies to facilitate looking up the security policy.

18. A method as in claim 17, wherein the cache memory comprises content addressable memories.

19. A method as in claim 18, further comprising operating the cache memory by:
sorting data entries in a memory array; and
performing a binary search to determine if a key entry matches any of the stored data entries in the memory array.

20. A method as in claim 14, further comprising in each of the first and second data paths looking up a security association to identify one or more applicable security associations under the network security protocol applicable to each data packet.

21. A method as in claim 20, wherein looking up a security association is performed on valid security associations stored in a cache memory.

22. A method as in claim 20, wherein the cache memory comprises content addressable memories.

23. A method as in claim 14, further comprising carrying out a key exchange algorithm under the network security protocol to determine encryption keys for encrypting the data packets.

24. A method as in claim 14, wherein the feedback encryption algorithm comprises a cipher block chaining mode encryption algorithm.

25. A method as in claim 14, wherein the method is carried out in an integrated circuit.

* * * * *